Jan. 14, 1930.  A. E. SHUBERT  1,743,984
MOTOR VEHICLE LIFTER
Filed July 20, 1928   2 Sheets-Sheet 1
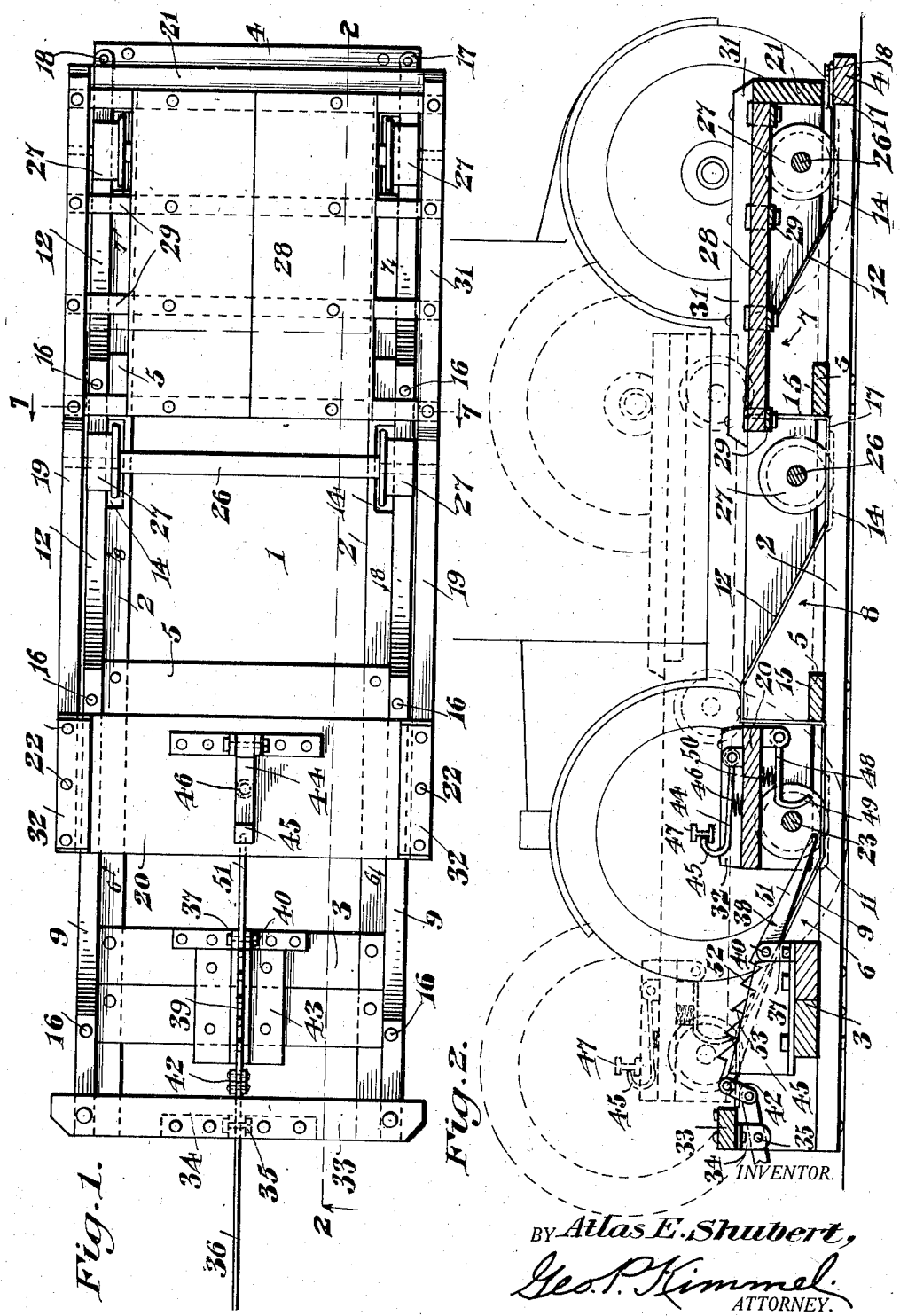
INVENTOR.
BY Atlas E. Shubert,
Geo. P. Kimmel.
ATTORNEY.

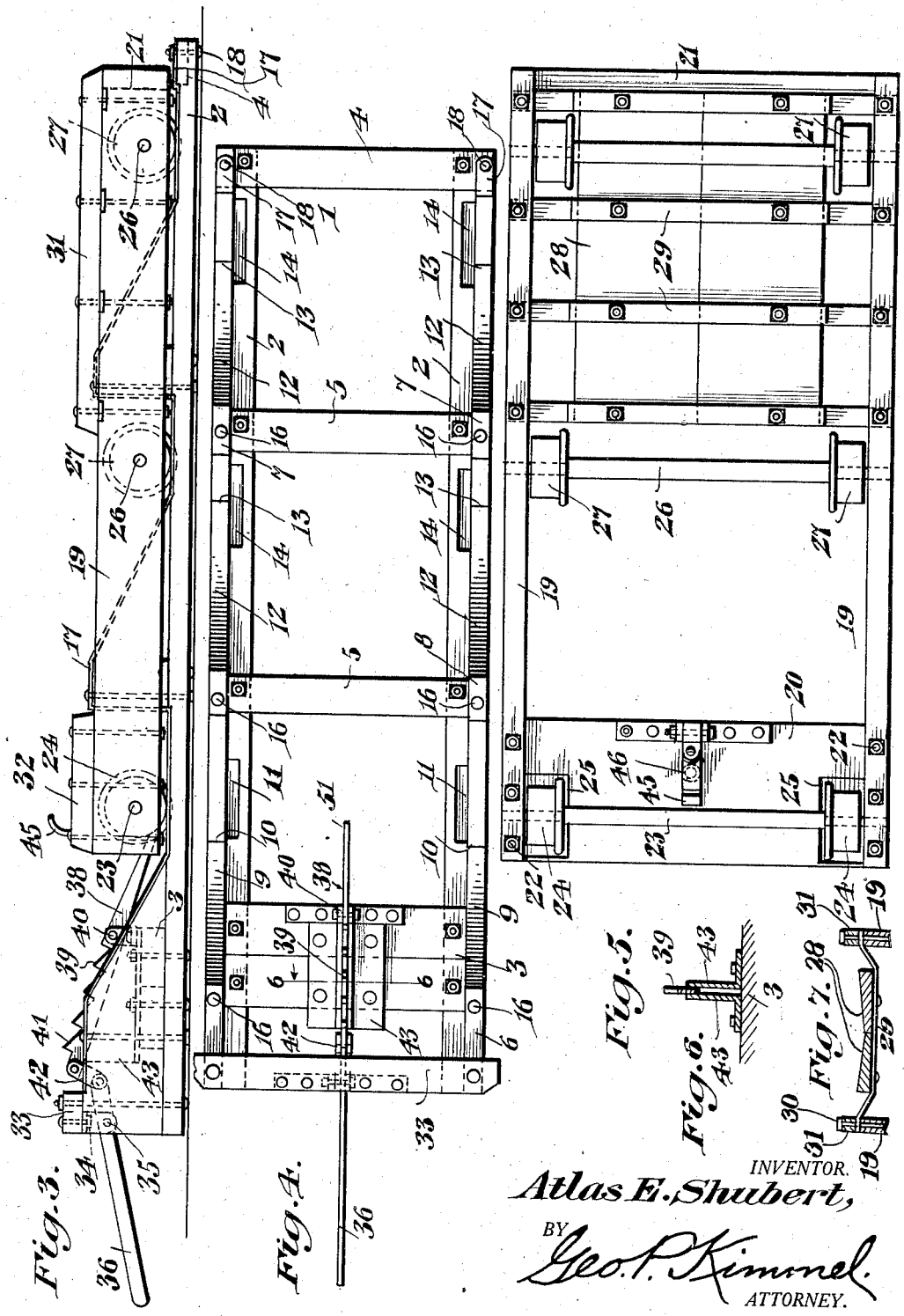

Patented Jan. 14, 1930

1,743,984

UNITED STATES PATENT OFFICE

ATLAS EUGENE SHUBERT, OF MEMPHIS, TENNESSEE

MOTOR-VEHICLE LIFTER

Application filed July 20, 1928. Serial No. 294,303.

This invention relates to a motor vehicle lifting device and has for its primary object to provide in a manner as hereinafter set forth, a device by means of which a motor vehicle may be expeditiously lifted by its own momentum to a position wherein all the wheels thereof are suspended to permit repair work to be done to the wheels and tires.

A further object of the invention is to provide a device as aforesaid which is adapted to be seated on the floor of a garage and which may be utilized to remove the weight of the motor vehicle from the tires during the time that the vehicle remains in the garage.

A further object of the invention is to provide a lifting device as aforesaid whereby a motor vehicle may be latched in a position wherein the weight of the vehicle may be utilized to start the same in motion by the release of the latching means therefor.

A further object of the invention is to provide a lifting device as aforesaid which is simple in construction, inexpensive to manufacture, strong and durable, positive in operation, and which may be operated entirely from the driver's seat of the vehicle.

Other objects and advantages of the invention will be apparent during the course of the following description.

In the accompanying drawings in which like numerals are employed to designate like parts throughout the same, Figure 1 is a top plan view of a lifting device constructed in accordance with this invention, Figure 2 is a section taken on line 2—2 of Figure 1, showing the elevated position of the carriage frame therefor in dotted lines, and showing diagrammatically the wheel for one side of a motor vehicle in association therewith, Figure 3 is a side elevation of the embodiment shown in Figure 1, Figure 4 is a top plan view of the base frame, Figure 5 is a bottom plan view of the carriage frame, Figure 6 is a section taken on line 6—6 of Figure 4, Figure 7 is a section taken on line 7—7 of Figure 1.

In the drawings wherein for the purpose of illustration is shown an embodiment of my invention, the numeral 1 designates generally a base frame consisting of a pair of side members 2, a front cross piece 3, a rear cross piece 4, and a pair of intermediate cross pieces 5. The cross pieces 3, 4 and 5 are seated on the upper faces of the side members 2 and the ends of the cross pieces are flush with the outer sides of the side members. The width of the cross member 3 is substantially twice that of each of the other cross members.

Mounted on the side members 2 is a forwardly disposed pair of inclined runways 6, a rearwardly disposed pair of runways 7, and an intermediately disposed pair of runways 8. The runways 6, 7 and 8 are disposed at right angles to the side members 2, with the lower edges of the runways seated on the upper faces of the side members, and with the outer faces of the runways flush with the outer faces of the side members. The forwardly disposed runways 6 are positioned with their forward ends flush with the forward ends of the side members 2 and terminate at their rearward ends between the cross piece 3 and the foremost cross piece 5. The runways 6 are inclined downwardly as at 9, from a point spaced from the forward ends thereof to the rearward ends thereof. The rearward ends of the runways 6 are indicated at 10, and are adjacent to recesses 11 formed in the upper faces of the side members 2. The runways 7 and 8 are formed with downwardly and rearwardly inclined upper faces 12, and their rear ends 13 are disposed adjacent to recesses 14, which are formed in the upper faces of the side members 2 similarly to the recesses 11. The lower faces of the runways 6, 7 and 8 are rabbeted as at 15 to receive therein the cross members 3 and 5, and are secured in position by means of suitable bolts 16, which extend through the respective runways, cross pieces and side members.

Mounted on the upper faces of the runways 6, 7 and 8 is a pair of tracks 17, the rearward ends of which are secured as at 18 to the rear cross piece 4. The aforesaid bolts 16 also extend through the track 17, for holding the latter in position. Mounted on the base frame 1 is a carriage frame comprising a pair of side members 19, a front cross member 20, and a rear cross member 21. The cross member 20 is positioned flatly on the upper faces of the side members 19 and is held in position by means of suitable bolts 22.

The cross member 21 is of slightly less length than the cross member 20, and the rear ends of the side members 19 are rabbeted to receive the ends of the cross member 21 therein. The rear face of the cross member 21 is flush with the rear ends of the cross members 19. Extending between the cross members 19, adjacent the forward ends thereof, is an axle 23, upon which is rotatably mounted a pair of flanged wheels 24. Adjacent the wheels 24, the lower surface of the cross member 20 is recessed as indicated at 25. Spaced rearwardly from the axle 23 is a similar pair of axles 26, upon which are rotatably mounted the flanged wheels 27. When the carriage frame is mounted on the base frame 2 in a non-elevated position, the flanges of the wheels 24 and 27 are respectively seated in the recesses 11 and 13 formed in the upper faces of the side members 2.

Upon relative movement between the carriage frame and base frame, the wheels 24 and 27 ride on the tracks 17. The carriage frame is of less length but of greater width than the base frame 2 as clearly shown in Figure 1, and the side members 19 overhang the side members 2.

Disposed between the transverse median and the rear end thereof, the carriage frame is provided with a support 28 for the rear portion of a motor vehicle. The support 28 is mounted on a plurality of straps 29, the ends of which are secured to the side members 19 by suitable bolts. The upper faces of the side members 19 are recessed in order that the upper faces of the straps 29 may be flush with the upper faces of the side members. The support 28 is positioned on the straps 29 with the side edges of the support spaced slightly inwardly from the inner faces of the frame members 2, and the upper face of the support 28 inclines downwardly from its side edges to the center thereof.

Adjacent the side edges of the support 28, the straps 29 are offset downwardly for a distance equal to the thickness of the support 28 at the side edges thereof, in order that the upper face of the support 28 at its side edges may be in horizontal alignment with the upper faces of the member 19. Seated on the upper faces of the side members 19 is a pair of side rails 31 for supporting the rear axle of a vehicle and a shorter pair of side rails 32 for supporting the front axle of the vehicle.

Seated on the upper faces of the runways 6, adjacent the forward ends thereof, is a cross bar 33. Depending from the lower face of the cross bar 33 is a pair of spaced, transversely perforated ears 34, between which is pivotally mounted as at 35, a trip lever 36. A similar pair of ears 37 is secured to the upper face of the cross member 3, adjacent the rearward edge thereof, and between the ears 37 is pivotally mounted a ratchet lever 38. The ratchet lever 38 is pivoted intermediate its ends and the teeth 39 thereof are disposed between the pivot point 40 and its forward end 41. The ratchet lever 38 and trip lever 36 are pivoted together by means of a link 42. Mounted on the upper face of the cross piece 3 is a guide 43, the sides of which extend vertically on either side of the latch lever 38. The guide 43 extends substantially from the pivot point 40 to the end 41 of the ratchet lever 38, and the sides thereof are spaced to permit a free reciprocating movement of the latch lever 38 therebetween.

Pivotally mounted on the upper surface of the cross member 20 is a forwardly extending member 44 terminating in an upturned hook portion 45. Disposed between the member 44 and the upper face of the cross member 20 is a coiled spring 46, the ends of which respectively abut against and are secured to the upper face of the cross member 20 and the lower face of the member 44. The spring 46 normally holds the member 44 in a forwardly and upwardly inclined position.

The hook 45 is adapted to engage the front axle, as 47, of a motor vehicle when the vehicle is driven over the carriage frame.

Pivotally secured to the lower face of the cross member 20 is a latch member 48, the forward end of which is downturned in the form of a hook as indicated at 49. Disposed between the latch member 48 and the cross member 20 is a coiled spring 50, the ends of which respectively abut against and are secured to the lower surface of the cross member 20 and the upper surface of the latch member 48. When the carriage frame is moved up the inclined runways 6, 7 and 8, the hook 49 of the latch member 48 is adapted to engage the teeth 39 of the ratchet lever 38.

In the operation of my lifting device, a motor vehicle is driven thereover to straddle the same with the carriage frame and base frame in assembled relation until the forward axle, as 47, of the vehicle comes in contact with the hook 45 of the member 44. The momentum of the vehicle is thus transmitted to the carriage frame, which causes the flanged wheels 24 and 27 to move upwardly upon the inclined runways 6, 7 and 8. As the carriage frame advances in a forward direction, the hook 49 of the latch member 48 is forced into contact by the spring 50 with the rearward end 51 of the ratchet lever 38 and ride thereover. So long as the forward motion of the carriage frame continues, the hook 49 will ride over the teeth 39 of the ratchet lever 38, owing to the fact that any pressure on the rearward faces 52 of the teeth 39 tends to force the forward end 41 of the ratchet lever 38 downwardly between the upright members of the guide 43. As soon as the forward motion of the carriage frame is stopped, the hook 49 engages the forward face 53 of one of the teeth 39 and prevents the carriage frame from returning down the inclined runways 6, 7 and 8. When it is desired to release the latching engagement between the hook 49 and ratchet lever 38, the trip lever 36 is lifted, which forces the forward end 41 of the ratchet lever 38 down between the uprights of the guide 43.

As the latch member 38 is forced downwardly between the upright members of the guides 43, the upper edges of the guides are brought in contact with the lower edge of the hook 49 to force the same out of engagement with the teeth 39. As soon as the engagement between the hook 49 and teeth 39 is released, the weight of the vehicle upon the carriage frame actuates the latter to return the same down the runways 6, 7 and 8. The trip lever 36 may be actuated from the driver's seat by any suitable means, such as a rope secured to the forward end of the latch lever 36 and run over a suitable pulley into adjacency to the driver's seat. The manner of actuating the latch lever 36 is not essential and is not illustrated.

It is to be understood that the form of the invention herewith shown and described is to be taken as a preferred example of the same and that various changes in the size, shape and arrangement of parts may be resorted to without departing from the spirit of the invention or the scope of the appended claim.

What I claim is:

A vehicle lifter comprising, a base, a plurality of inclined runways thereon, a carriage having a plurality of trucks for mounting the same on the base, means on the carriage for engagement with a vehicle whereby the momentum of the latter actuates the carriage to climb said inclined runways, a guide mounted on the base and having a pair of spaced side members, a lever pivotally supported by the base and having its forward end portion extending between the vertical planes of said side members, said forward end portion being formed with a series of teeth normally projecting above the upper edges of the side members, a latch member pivotally mounted on the carriage and having a spring to force it into engagement with said lever upon movement of the carriage relative to the base whereby the teeth will be engaged by the latch member to maintain the carriage in elevated position, and a trip mechanism connected with said lever for moving the latter about its pivot to force said teeth below the upper edges of said side members to remove the latch member from engagement with the teeth.

In testimony whereof, I affix my signature hereto.

ATLAS EUGENE SHUBERT.